(No Model.)

C. W. CLARK.
KEY FOR PULLEYS.

No. 402,065.   Patented Apr. 23, 1889.

Witnesses:
J. B. McGirr.
J. C. Turner.

Inventor
Chester W Clark
by Doubleday & Bliss attys.

UNITED STATES PATENT OFFICE.

CHESTER W. CLARK, OF MISHAWAKA, INDIANA.

KEY FOR PULLEYS.

SPECIFICATION forming part of Letters Patent No. 402,065, dated April 23, 1889.

Application filed June 11, 1888. Serial No. 276,683. (No model.)

*To all whom it may concern:*

Be it known that I, CHESTER W. CLARK, a citizen of the United States, residing at Mishawaka, in the county of St. Joseph and State of Indiana, have invented certain new and useful Improvements in Keys for Pulleys, of which the following is a specification, reference being had therein to the accompanying drawings.

Figure 1:
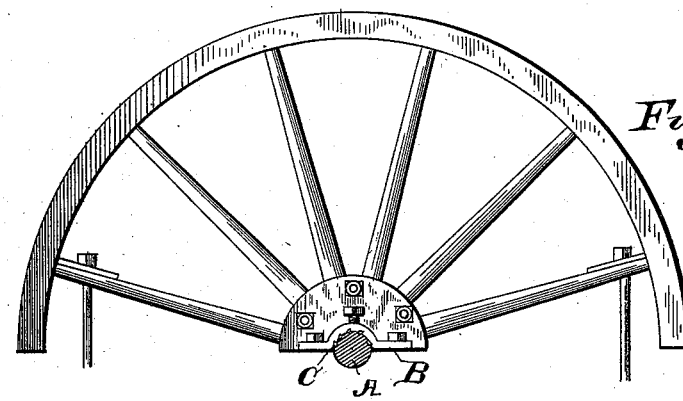
Figure 2:
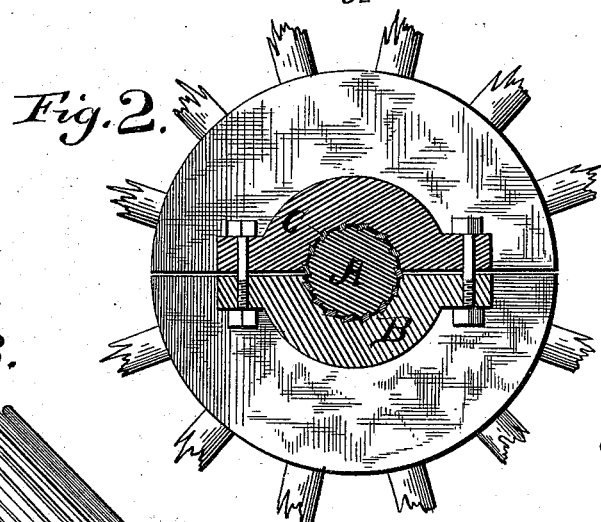
Figure 3:
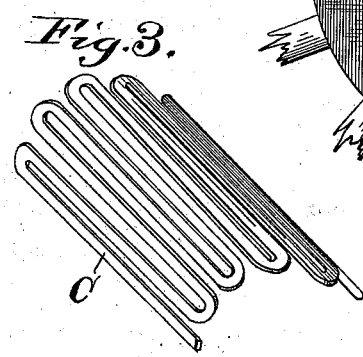
Figure 4:
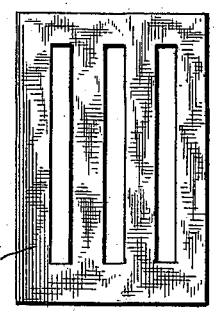
Figure 5:
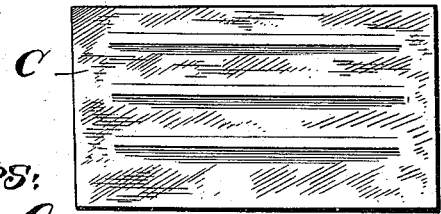
Figure 6:
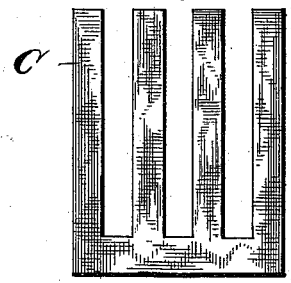

Figure 1 is an elevation of so much of a pulley and its shaft as is necessary to illustrate the invention. Fig. 2 is a vertical section, enlarged, taken transversely of the hub of the pulley and the shaft. Fig. 3 is a detached view of a key shown in Figs. 1 and 2. Figs. 4, 5, and 6 show modified forms of the key.

The object of this invention is to facilitate the rapid and effectual keying of a pulley to a shaft which has a diameter less than the bore of the hub of the pulley, one object of the invention being to provide a construction whereby a pulley with a given diameter of bore of its hub can be readily applied to and keyed firmly to shafts of different diameters.

Prior to my invention bushings have been made in semi-tubular form hinged together and screw-threaded externally, and having their inner surfaces lined with emery to insure a satisfactory frictional contact with the shaft; but in such construction it was necessary to locate the bushing upon the shaft and afterward screw the pulley, its hub being internally threaded, upon the bushing, and of course great accuracy in the fit of the parts was required in order to attain satisfactory results. Again, it was common to bush the hubs of pulleys with semi-tubular bushings driven tightly into the hub and subsequently bored out to fit the shaft.

One method heretofore known of keying a pulley to a shaft which fitted tightly within the pulley-hub was by means of a key fitting a key-seat in the pulley-hub, with its inner face concaved upon a circle of less diameter than the shaft, so as to leave comparatively sharp cutting-edges to take hold of the shaft; hence I claim none of these reconstructions.

Referring to the drawings, A is the shaft, and B the hub, of a pulley. The shaft is round in cross-section, with a practically unbroken surface—that is to say, it has no key seat or groove. So, also, the bore of the hub of the pulley is round in cross-section, and presents a substantially unbroken surface—at least it has no key-seat formed therein—although the hub may be made in two sections bolted together, in which case it is not indispensable to the successful working of my invention that the two parts of the hub should fit each other with accuracy.

C represents generally the key. In its preferred form, as indicated in Fig. 3, it consists, essentially, of a steel wire, rod, or strip so bent as to have a series of ribs arranged parallel to each other, connected at their ends by bends or double elbows, so as to form a continuous piece. In fact, I prefer to form this key by bending a piece of steel wire or a steel rod into the form indicated in Fig. 3. I prefer to use for this purpose a rod of steel which is angular in cross-section, substantially as indicated in Fig. 2, and to make it of such size, shape, and degree of hardness that when compressed between the shaft and its surrounding pulley and hub the corners shall not only impinge upon but shall cut slightly into both the shaft and hub to insure a sufficient grip of the parts upon each other. Under ordinary circumstances I propose to make this key with a sufficient number of parallel ribs to insure that when two of them are placed upon opposite sides of the shaft the spaces between the end ribs of the pair of keys shall be of no greater width than the width of the space between any other two of the ribs, as is indicated in Fig. 2; but under some circumstances, where the work required of the pulley is comparatively light, a fewer number of ribs may be used upon the opposite sides of the shaft—that is to say, as indicated in Fig. 3, ten parallel ribs connected together represent in cross-section nearly a semicircle, as is intended to be used in attaining the best possible results; but a less number—say six or eight, representing an arc of, say, ninety to one hundred and twenty degrees—may be satisfactorily used. So, also, under some circumstances these keys may be made of wire or a rod which is round in cross-section, instead of having corners.

In Fig. 4 I have shown a modification in which the key is made of a flat sheet of metal having slots formed therein, so as to leave a series of ribs, after which it may be bent into parti-cylindrical form in cross-section. In this instance, also, it is preferred that some or all of the edges or corners of these ribs be angular, so as to cut slightly into the surface of the shaft or the bore of the hub, or both.

In Fig. 5 there is shown another modification in which, instead of having slots between the sections, the plate of metal is continuous, and is provided upon either its inner surface or its outer surface, or both surfaces, with ridges, either curved or angular in cross-section, and thereby adapted to operate in substantially the same way as the other parallel ribs, so far as relates to securing the pulley to the shaft, the plate upon which these key-sections are formed being curved in cross-section to facilitate its being driven in between the shaft and the hub. This form of key will sometimes be found very useful, because of its being specially adapted, being formed of an imperforate plate of metal, for being driven in between the shaft and the pulley-hub.

In Fig. 6 the invention is shown as being carried out in the form of a key consisting of a series of parallel ribs, each of practically uniform width from end to end, all of the ribs being connected by a web or band formed in one and the same piece therewith, and all of the ribs projecting laterally from said band, the opposite ends of the ribs being separate from each other. Of course in this instance I prefer that the edges of these ribs should be angular and projecting a little from the original level of the flat strip of which they are formed, to insure that they shall the more readily take hold of the adjoining metal.

It will under many circumstances be found advisable to form the keys shown in Figs. 4, 5, and 6 from a strip of metal which is slightly wedge-shaped in cross-section, as is frequently customary in keys, to facilitate driving them tightly home, and the same end may be attained in the case of a key made from a single continuous wire or rod by stamping, swaging, or otherwise imparting a slight taper to the parallel ribs.

The form shown in Fig. 3 possesses some advantages over either of the others, in that by reason of the adjacent ribs being connected at one end only they can be made to conform accurately to shafts of different diameters, each of the ribs twisting slightly for that purpose without interfering with the grip of the corners upon either the shaft or the hub of the pulley.

I am aware that pulley-hubs have been made in short sections divided on a plane intersecting the axis of the hub at right angles, such hubs having been slotted from their centers outward, so that the fingers thus produced could be gripped upon the shaft; hence when in this case I use the word "semi-tubular" I mean a tube which is divided on a plane parallel with its axis as contradistinguished from a pulley-hub which is divided on a plane transverse to its axis.

This invention is specially adapted for securing split pulleys or divided pulleys to a shaft, because the keys can be readily compressed between the shaft and the split or divided hub of the pulley; but I do not wish to be limited to such use or combination of parts. With either form of pulley-hub driving the keys in a short distance after they have come to fit closely the annular space between the shaft and inside of the hub will cause the corners of the ribs to take into the adjacent metal and produce a firm grip.

What I claim is—

1. A pulley-key formed of a single strip of metal bent to form parallel ribs connected at their ends, substantially as set forth.

2. A pulley-key having a series of ribs arranged in parallel rows, connected to each other at their ends and provided upon their outer and inner corners with cutting-edges, substantially as set forth.

3. The combination, with a pulley-hub and a shaft of less diameter arranged to have an annular space surrounding the shaft, of keys, each having a series of ribs connected with each other at their ends and arranged upon opposite sides of the shaft.

In testimony whereof I affix my signature in presence of two witnesses.

CHESTER W. CLARK.

Witnesses:
THERON D. KEASEY,
ALBERT MYERS.